US010612661B2

(12) United States Patent
Daniels et al.

(10) Patent No.: US 10,612,661 B2
(45) Date of Patent: Apr. 7, 2020

(54) LOW-EMISSION BONNET SEAL

(71) Applicant: CLARKE INDUSTRIAL ENGINEERING INC., North Kingstown, RI (US)

(72) Inventors: Kyle Daniels, North Kingstown, RI (US); Mark Laurito, North Kingstown, RI (US); Bernard Bourque, North Kingstown, RI (US)

(73) Assignee: Clarke Industrial Engineering Inc., North Kingstown, RI (US)

( * ) Notice: Subject to any disclaimer, the term of this patent is extended or adjusted under 35 U.S.C. 154(b) by 0 days.

(21) Appl. No.: 16/371,882

(22) Filed: Apr. 1, 2019

(65) Prior Publication Data
US 2019/0301613 A1    Oct. 3, 2019

Related U.S. Application Data

(60) Provisional application No. 62/650,767, filed on Mar. 30, 2018.

(51) Int. Cl.
*F16J 15/3204* (2016.01)

(52) U.S. Cl.
CPC ................ *F16J 15/3204* (2013.01)

(58) Field of Classification Search
CPC ......... F16J 15/32; F16J 15/3204; F16J 15/20; F16J 15/3208; F16J 15/3252; F16K 3/24; F16K 3/243; F16K 47/00; F16K 47/08; Y10T 137/86799
USPC ........................................................ 277/529
See application file for complete search history.

(56) References Cited

U.S. PATENT DOCUMENTS

| 3,653,670 | A | * | 4/1972 | Sifri | ..................... | B29C 33/005 |
| | | | | | | 277/438 |
| 6,840,520 | B2 | * | 1/2005 | Faas | ....................... | F16K 3/243 |
| | | | | | | 137/625.38 |
| 8,505,924 | B2 | * | 8/2013 | Dietle | ................... | F16J 15/008 |
| | | | | | | 277/349 |
| 2003/0222410 | A1 | * | 12/2003 | Williams | ............ | E21B 33/1208 |
| | | | | | | 277/619 |

* cited by examiner

*Primary Examiner* — Nathan Cumar
(74) *Attorney, Agent, or Firm* — Morris, Manning & Martin, LLP; Daniel E. Sineway, Esq.; Bryan D. Stewart, Esq.

(57) ABSTRACT

The present disclosure generally relates to sealing a bonnet in a valve system. Using novel combinations of seals and gaskets, the present systems can prevent fugitive emissions in a high pressure piping system. For example, in certain embodiments, the present systems combine spring energized seals, O-rings, and PTFE spacers in a bonnet to create a gas-tight seal in a fluid transportation system.

27 Claims, 7 Drawing Sheets

LOW-EMISSION BONNET SEAL

CROSS REFERENCE TO RELATED APPLICATIONS

This application claims priority to, the benefit under 35 U.S.C. § 119 of, and incorporates by reference herein in its entirety U.S. Provisional Patent Application No. 62/650,767, filed Mar. 30, 2018, and entitled "LOW-EMISSION BONNET SEAL."

TECHNICAL FIELD

The present disclosure relates generally to sealing a bonnet in a high pressure valve assembly, and more particularly, to an arrangement of seals, gaskets, spacers, and potentially other components in optimal configurations within a bonnet of a valve assembly to reduce emissions.

BACKGROUND

Industrial activities are known to generate substantial amounts of pollution. Much of this pollution is directly caused by emissions vented through a chimney, vent, or other opening designed specifically to emit waste. However not all pollution generated by industrial activities is intentional. Fugitive emissions occur when gases or vapors leak from pressurized process equipment through valves, pipe connections, mechanical seals, or other related equipment. These leaks are typically small in size, but the negative effect on the atmosphere can be tremendous, depending on the type of substance and the cumulative volume of pressurized processing occurring.

Furthermore, in addition to the harmful atmospheric effect, fugitive emissions also create health concerns for nearby persons who may inadvertently inhale harmful substances. Additionally, fugitive emissions are a cause for concern because escaping gas may lead to increased corrosion around parts and equipment, which increases repair and maintenance expenses. Businesses are also wary of fugitive emissions because of the unaccounted for loss of product. Businesses operating mass production factories lose substantial revenue due to the loss of product through fugitive emissions. Fugitive emissions are difficult to detect and difficult to prevent in high pressure situations. Accordingly, those involved in industrial activities are constantly in search of methods to reduce or eliminate fugitive emissions.

Therefore, there is a long-felt but unresolved need for a system or method that can seal a bonnet in a high pressure valve assembly, such that unintentional leakage is significantly reduced to a more nominal value.

BRIEF SUMMARY OF DISCLOSURE

Briefly described, and according to one embodiment, aspects of the present disclosure generally relate to bonnet seals. In various embodiments, a bonnet with a shaft cavity and one or more annular cavities (or glands) is disclosed. In particular embodiments, the bonnet is operatively connected to a valve body to form the casing that holds a substance flowing through the valve. In some embodiments the bonnet includes one or more O-rings placed within the one or more annular cavities for increased sealant properties. In various embodiments, the bonnet includes one or more spring energized seals placed within the one or more annular cavities.

In particular embodiments, a bonnet with no annular cavities or glands is disclosed. In these embodiments (and others), the bonnet includes one or more O-rings integrally connected to the bonnet. In at least one embodiment, the bonnet includes more than one O-ring in a stacked configuration within the bonnet. In certain embodiments, the bonnet includes one or more spring energized seals integrally connected to the bonnet. In one embodiment, the bonnet includes more than one spring energized seal in a stacked configuration within the bonnet. According to various embodiments, the bonnet may have any acceptable cross-section, including, but not limited to, cylindrical or square, etc.

As will be understood by a person having ordinary skill in the art, the bonnet seal assembly discussed herein may be used for sealing any variety of substances flowing through a valve body, including, but not limited to: water, oils, gases, chemicals, and other such substances, both viscous and non-viscous. In particular embodiments, the bonnet may be manufactured from any suitable material, or materials for sealing such substances. In various embodiments, the bonnet is manufactured from metal or composite metal, including, but not limited to: Incoloy, Hastelloy, Titanium, Waspaloy, or stainless steel. In particular embodiments, the bonnet is manufactured from plastic.

According to particular embodiments, the present disclosure generally describes a sealing assembly, whereby the sealing assembly includes a sealing body (e.g. a bonnet 210 in FIGS. 1 and 2) having a cylindrical cavity therein, the cylindrical cavity having a first opening and a second opening for receiving a shaft therethrough; and a set of sealing components disposed along an inner annular surface of the cylindrical cavity for preventing fluid flow from the first opening to the second opening between the inner annular surface of the cylindrical cavity and the shaft, the set of sealing components including an O-ring and a spring-energized seal.

In particular embodiments, the present disclosure describes the sealing assembly herein, wherein the O-ring is positioned closer to the first opening than is the spring-energized seal. In at least one embodiment, the present disclosure describes the sealing assembly herein, wherein the set of sealing components further includes a spacer positioned along the inner annular surface of the cylindrical cavity between the O-ring and the spring-energized seal. In various embodiments, the present disclosure describes the sealing assembly herein, wherein the set of sealing components further includes a second O-ring positioned closer to the first opening than is the O-ring. In some embodiments, the present disclosure describes the sealing assembly herein, wherein the set of sealing components further includes a second spacer positioned along the inner annular surface of the cylindrical cavity between the O-ring and the second O-ring. In one or more embodiments, the present disclosure describes the sealing assembly herein, wherein the cylindrical cavity includes a recess within which the set of sealing components are disposed. In particular embodiments, the present disclosure describes the sealing assembly herein, wherein the recess includes at least two diameters including a larger diameter and a smaller diameter, wherein the spring-energized seal is disposed in the smaller diameter. In various embodiments, the present disclosure describes the sealing assembly herein, wherein the cylindrical cavity includes at least two annular notches. In at least one embodiment, the present disclosure describes the sealing assembly herein, wherein the O-ring is disposed within a first annular notch and the spring-energized seal is disposed within a second annular notch. In certain embodiments, the present disclosure describes the sealing assembly herein, wherein the spring-energized seal is positioned closer to the first opening than is the O-ring.

According to various embodiments, the present disclosure generally describes a sealing assembly for a valve, whereby the sealing assembly for a valve includes a valve body for regulating fluid flow therethrough; a bonnet seal (e.g. a bonnet 210 in FIGS. 1 and 2) affixed to the valve body, the bonnet seal having a cylindrical cavity therein, the cylindrical cavity having a first opening operatively connected to a corresponding opening on the valve body and a second opening for receiving a shaft therethrough, the shaft being operatively attached to the valve body and for regulating the fluid flow; and a set of sealing components disposed along an inner annular surface of the cylindrical cavity for preventing fugitive emissions from the valve body through the first opening to the second opening between the inner annular surface of the cylindrical cavity and the shaft, the set of sealing components including an O-ring and a spring-energized seal.

In certain embodiments, the present disclosure describes the sealing assembly herein, wherein the O-ring is positioned closer to the first opening than is the spring-energized seal. In various embodiments, the present disclosure describes the sealing assembly herein, wherein the set of sealing components further includes a spacer positioned along the inner annular surface of the cylindrical cavity between the O-ring and the spring-energized seal. In one or more embodiments, the present disclosure describes the sealing assembly herein, wherein the set of sealing components further includes a second O-ring positioned closer to the first opening than is the O-ring. In some embodiments, the present disclosure describes the sealing assembly herein, wherein the set of sealing components further includes a second spacer positioned along the inner annular surface of the cylindrical cavity between the O-ring and the second O-ring. In at least one embodiment, the present disclosure describes the sealing assembly herein, wherein the cylindrical cavity includes a recess within which the set of sealing components are disposed. In particular embodiments, the present disclosure describes the sealing assembly herein, wherein the recess includes at least two diameters including a larger diameter and a smaller diameter, wherein the spring-energized seal is disposed in the smaller diameter. In certain embodiments, the present disclosure describes the sealing assembly herein, wherein the cylindrical cavity includes at least two annular notches. In some embodiments, the present disclosure describes the sealing assembly herein, wherein the O-ring is disposed within a first annular notch and the spring-energized seal is disposed within a second annular notch. In various embodiments, the present disclosure describes the sealing assembly herein, wherein the spring-energized seal is positioned closer to the first opening than is the O-ring.

These and other aspects, features, and benefits of the claimed system will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

DETAILED DESCRIPTION

For the purpose of promoting an understanding of the principles of the present disclosure, reference will now be made to the embodiments illustrated in the drawings and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates. All limitations of scope should be determined in accordance with and as expressed in the claims.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

The above and further features of the disclosed exemplary bonnet seal assembly will be recognized from the following detailed descriptions and drawings of particular embodiments.

Overview

In various embodiments, a bonnet with a shaft cavity and one or more annular cavities or glands is disclosed. In particular embodiments, the bonnet is operatively connected to a valve body to form the casing that holds a substance flowing through the valve. In some embodiments the bonnet includes one or more O-rings placed within the one or more annular cavities for increased sealant properties. In various embodiments, the bonnet includes one or more spring energized seals placed within the one or more annular cavities.

In particular embodiments, a bonnet with no annular cavities or glands is disclosed. In these embodiments, the bonnet includes one or more O-rings integrally connected to the bonnet. In at least one embodiment, the bonnet includes more than one O-ring in a stacked configuration within the bonnet. In certain embodiments, the bonnet includes one or more spring energized seals integrally connected to the bonnet. In one embodiment, the bonnet includes more than one spring energized seal in a stacked configuration within the bonnet. According to various embodiments, the bonnet may have any acceptable cross-section, including, but not limited to, cylindrical or square, etc.

As will be understood by a person having ordinary skill in the art, the bonnet seal assembly discussed herein may be used for sealing any variety of substances flowing through a valve body, including, but not limited to: water, oils, gases, chemicals, and other such substances, both viscous and non-viscous. The bonnet may be manufactured from any suitable material, or materials for sealing such substances. In various embodiments, the bonnet is manufactured from metal or composite metal, including, but not limited to: Incoloy, Hastelloy, Titanium, Waspaloy, or stainless steel. In particular embodiments, the bonnet is manufactured from plastic.

Exemplary Embodiments

Figure 1:
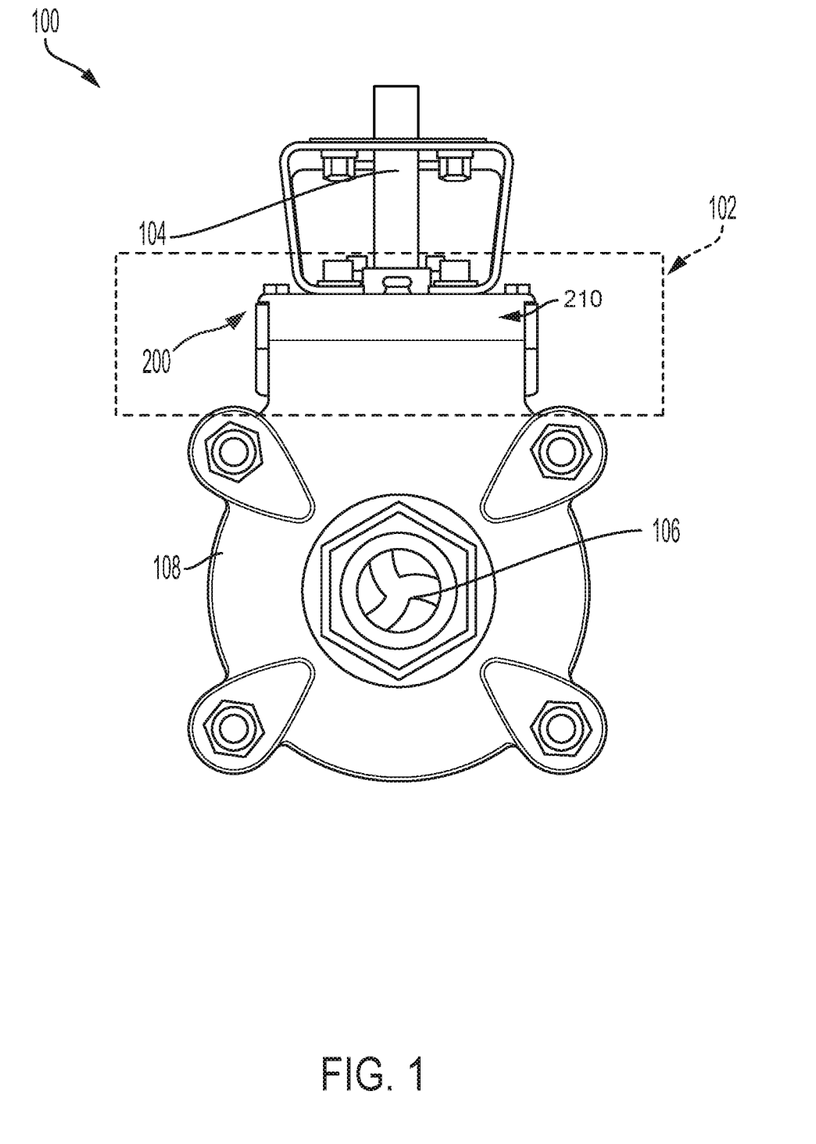
FIG. 1 illustrates a front plan view of an exemplary valve containing a bonnet seal assembly, according to one embodiment of the present disclosure.

Turning now to FIG. 1, a front plan view of an exemplary valve 100 is shown, according to one embodiment of the present disclosure. In various embodiments, and as will be further discussed herein, a bonnet 210 is contained within the upper portion 102 of a valve 100. In certain embodiments, a valve may be a component in a piping system for transporting fluids or other suitable substances (e.g., gases). In particular embodiments, the valve 100 includes a shaft 104 passing through the bonnet and operatively connected to a disc 106, whereby the disc is operative to control (e.g., allow or restrict) fluid flowing through a valve body 108. In one embodiment, upon rotation of the shaft 104, the disc 106 may move from an open position to a closed position, such that fluid is restricted from flowing through the valve body. In another embodiment, upon rotation of the shaft 104 in an opposite direction, the disc may move from a closed position to an open position, whereby fluid may flow through the valve body 108. In these embodiments (and others), the fluid flowing through the valve body may exert an upward pressure on the bonnet 210, such that fluid may inadvertently escape through crevices existing where the bonnet connects to the valve body 108. In various embodiments, and as will be further discussed herein, a bonnet may contain a bonnet seal assembly (i.e., an arrangement of sealing mechanisms) to mitigate or eliminate the amount of fluid that inadvertently escapes.

Figure 2:
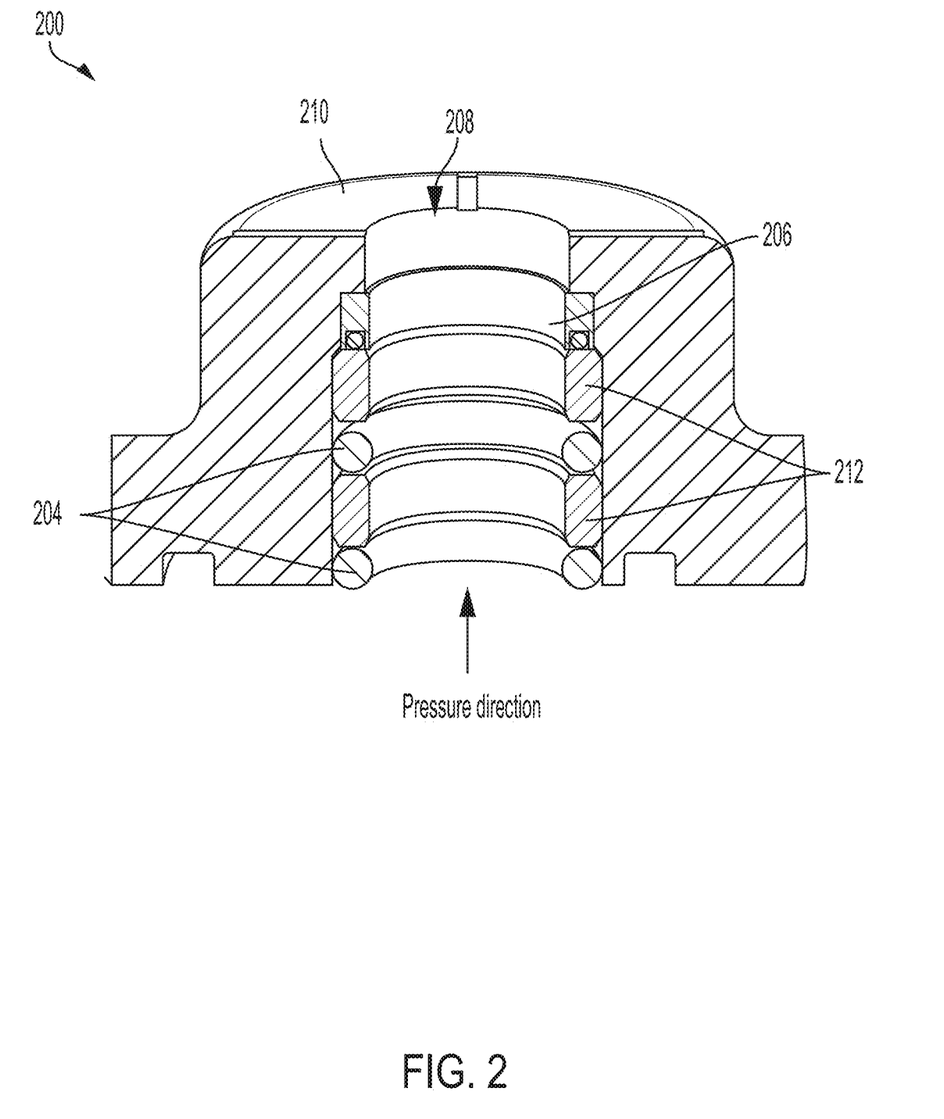
FIG. 2 illustrates a cross sectional view of an exemplary bonnet seal assembly, according to one embodiment of the present disclosure.

Referring now to FIG. 2, a cross sectional view of an exemplary bonnet seal assembly 200 is shown, according to one embodiment of the present disclosure. In particular embodiments, and as mentioned briefly above, the exemplary bonnet seal assembly includes a bonnet 210 that is securely and integrally connected to a valve body, or other casing designed to facilitate the flow of substances, to further provide a leak-resistant seal when integrally connected to the valve body. In various embodiments, the bonnet seal assembly 200 may be positioned perpendicular to the direction of the flow of substances within the valve body 202. In at least one embodiment, the bonnet containing the bonnet seal assembly is cylindrical in shape, but may be of any other shape (e.g., rectangular, star-shaped, etc.).

In various embodiments, the bonnet seal assembly 200 includes a shaft cavity 208, such that a shaft may pass through the bonnet 210 and operatively connect to a disc as described above. In particular embodiments, the bonnet seal assembly includes an arrangement of sealing mechanisms configured within the shaft cavity 208, such that the inadvertent release of fluid flowing through the valve may be mitigated. In one or more embodiments, sealing mechanisms that may be configured within the shaft cavity 208 include, but are not limited to: O-rings 204, spring energized seals 206, polytetrafluoroethylene (PTFE) spacers 212, gaskets, and the like.

Various aspects of the present disclosure include a bonnet 210 with a shaft cavity that contains one spring energized seal 206, two PTFE spacers 212, and two O-rings 204. As will be understood, an O-ring 204 may comprise a loop of elastomer designed to be situated in a cavity and compressed during assembly between two or more parts, creating a seal at the interface. In some embodiments, the O-ring is composed of rubber, polyurethanes, polybutadiene, neoprene, silicone, or other like materials. In particular embodiments, the cross-section of the O-ring may be circular, rectangular, or any other suitable shape. In the embodiment shown in FIG. 2, the O-ring 204 is located in the lowest position in the shaft cavity 208, such that it serves as the initial resistance point, and the initial point of contact between the bonnet seal assembly 200 and the substance flowing through the valve body.

Continuing with FIG. 2, the first of two PTFE spacers 212 is located in the shaft cavity directly above the first O-ring. In the event that a substance, or portion of a substance, makes it past the first O-ring 204, in this embodiment the first of two spacers 212 serve to provide a secondary sealing mechanism and a resistance measure against any corrosion that the escaping substance may potentially cause. In one or more embodiments, a PTFE spacer may comprise a semi-rigid loop designed to insulate and protect piping among other uses. In some embodiments, the spacer is composed of polypropylene, polyvinylidene fluoride, PTFE, or other like materials. In particular embodiments, the cross-section of the spacer may be circular, rectangular, or any other suitable shape.

Further continuing with FIG. 2, a second O-ring 204 and a second PTFE spacer 212 are included as a secondary blocking mechanism directly following the first PTFE spacer. In this particular embodiment, this redundancy of sealants is included to provide additional protection against fugitive emissions in the event that a substance is able to pass through the first O-ring and first PTFE spacer.

In the embodiment shown in FIG. 2, the bonnet seal assembly 200 is completed with the inclusion of a spring energized seal 206. According to this disclosure, a spring energized seal is a sealing ring with a corrosion resistant metal spring to facilitate the seal. Non-limiting examples of spring energized seals include: AVX™ shaft oil seal dual spring DC26×37×10.5 rubber covered double lip w/garter spring, available at AVX Seals Corporation, 2165 South Dupont Drive, Suite G, Anaheim, Calif. 92806, or at www.avxseals.com; AmeriSeal™ high performance metal seal, available at American Seal & Engineering, 295 Indian River Road, Orange, Conn. 06477, or at www.ameriseal.com; or ERIKS cantilever spring energized seal, available at ERIKS Seals and Plastics, Inc., 1160 Mustang Drive, Suite 100, DFW Airport, Tex. 75261, or at www.eriksusa.com. When the sealing ring is positioned in the cavity, the seal and spring are compressed in a radial direction. The radial tension keeps the seal in contact with the walls of the shaft cavity 208 even before pressure is applied by a flowing substance. However, when pressure is applied, the spring action is intensified as the spring is compressed and exerts pressure on the sealing surfaces, energizing a tight barrier to prevent leakage of gas or fluids.

In the embodiment shown in FIG. 2, the spring energized seal is placed at the top of the shaft cavity 208, such that it surrounds the shaft and functions as a last line of defense against any substance able to bypass the two O-rings 204 and two PTFE spacers 212. In one embodiment, the spring energized seal is positioned snuggly within the shaft cavity, such that the spring is constantly pushing out against both the shaft 104, and the walls of the shaft cavity 208, creating a gas tight seal. Continuing with this embodiment, as the substance flowing through the valve body applies pressure upwards into the bonnet 210, the spring action of the spring energized seal intensifies and creates a tighter seal with better sealing efficiency, so that any fugitive emission is non-existent or nominal.

In certain embodiments, the arrangement of the sealing mechanisms within the bonnet may vary. In particular embodiments, the bonnet 210 may include one O-ring 204, one spring energized seal 206, and one PTFE spacer 212. In one embodiment, the O-ring may be the initial sealing mechanism, followed by the spring energized seal and PTFE spacer, or the PTFE spacer and the spring energized seal. In another embodiment, the spring energized seal 206 may be the initial sealing mechanism, followed by the O-ring 204 and PTFE spacer 212, or the PTFE spacer and the O-ring. In yet another embodiment, the PTFE spacer may be the initial sealing mechanism, followed by the spring energized seal and the O-ring, or the O-ring and the spring energized seal. In at least one embodiment, an exemplary bonnet seal assembly 200 does not include any PTFE spacers, and the walls of the shaft cavity are operative to insulate, resist corrosion, and protect the piping.

Figure 3:
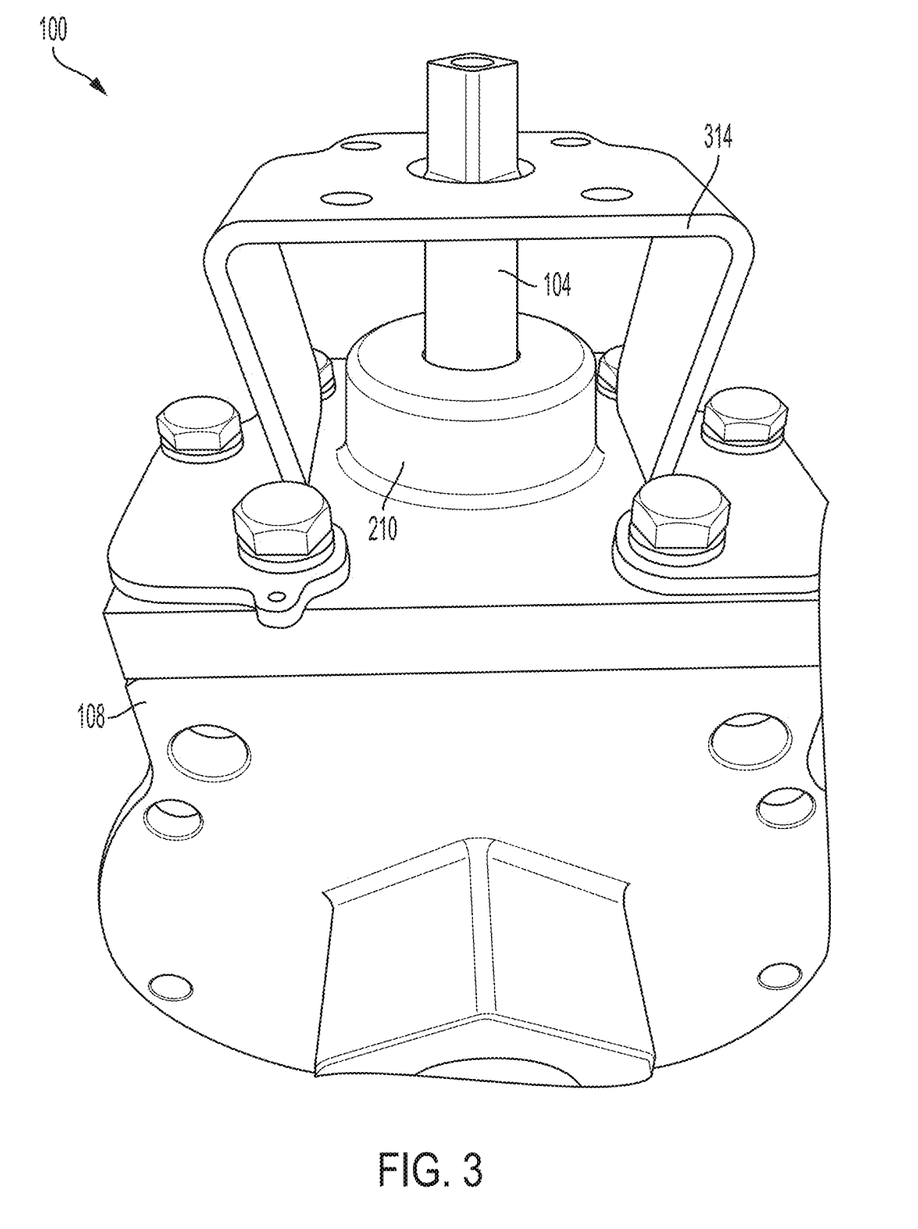
FIG. 3 illustrates a perspective view of an exemplary valve containing a bonnet seal assembly, according to one embodiment of the present disclosure.

FIG. 3 shows an exemplary valve, or valve assembly 100 containing a bonnet seal assembly 200, according to one embodiment of the present disclosure. In particular embodiments, and as described above, the exemplary valve includes a bonnet 210 that is configured to be securely positioned on top of, or perpendicular to, a valve body 108, or other casing designed to facilitate the flow of substances. In various embodiments, the exemplary valve assembly includes a stem, or shaft 104 that is operatively connected to a handle (not shown) or actuator (not shown) for opening and closing the valve to control the flow of fluid through the valve body. In some embodiments, the valve assembly 100 includes a yoke 314 for connecting the valve body 108 or bonnet 210 with the handle or actuator, or otherwise adding stability or connection points to the valve assembly.

According to various aspects of the present disclosure, the valve assembly 100 includes a stem, or shaft 104 that passes through the bonnet 210 and transmits motion from the handle or actuator to a disc within the valve (not shown), which operates to allow or restrict fluid flow through the valve assembly. In various embodiments, the inclusion of the shaft provides an undesired alternative direction for which fluid flowing through a valve assembly 100 may exit the system in the spaces around the shaft and generate the above described fugitive emission. In these embodiments (and others), the bonnet 210 containing the exemplary bonnet seal assembly 200 serves to reduce and eliminate such fugitive emissions.

As an example, a user transporting natural gas through a pipeline may seek to control the flow of the gas by using a valve that can be opened or closed at the user's discretion via a handle or actuator. In order to minimize fugitive emissions, the user may encase the stem, or shaft 104 within an exemplary bonnet 210 containing an exemplary bonnet seal assembly 200, and operatively connect the exemplary bonnet containing the exemplary bonnet seal assembly to the valve body 108. As exemplified and described in FIG. 2, when the valve is closed, the gas flowing through the pipeline exerts a continuous pressure upwards at the intersection of the valve body and the bonnet, where the gas seeks to exit the system via the space around the shaft 104. In the current embodiment (shown in FIG. 2), the gas makes initial contact with the first of two O-rings 204 and is substantially blocked from escaping the system. In the event that some gas is able to escape past the first of two O-rings, the system is configured where the first of two PTFE spacers 212 will provide a deterrent to any corrosive effects of the escaping gas. If natural gas continues to escape past the first of two O-rings and the first of two spacers, a redundancy of sealants will continue to prevent fugitive emissions in the form of a second O-ring and second PTFE spacer. Nevertheless, in the current embodiment, if some gas is able to bypass both O-rings 204 and both PTFE spacers 212, the elusive natural gas will encounter a spring energized seal 206 as a last line of defense to nominalize any fugitive emission of natural gas.

The scope of the system described herein should not be limited to valve assemblies for piping systems. The disclosed bonnet seal assembly may apply to other systems including, but not limited to: internal engine components, pressurized cooking systems, air compressors, material processing systems, vacuum systems, and other suitable systems.

Figure 4:
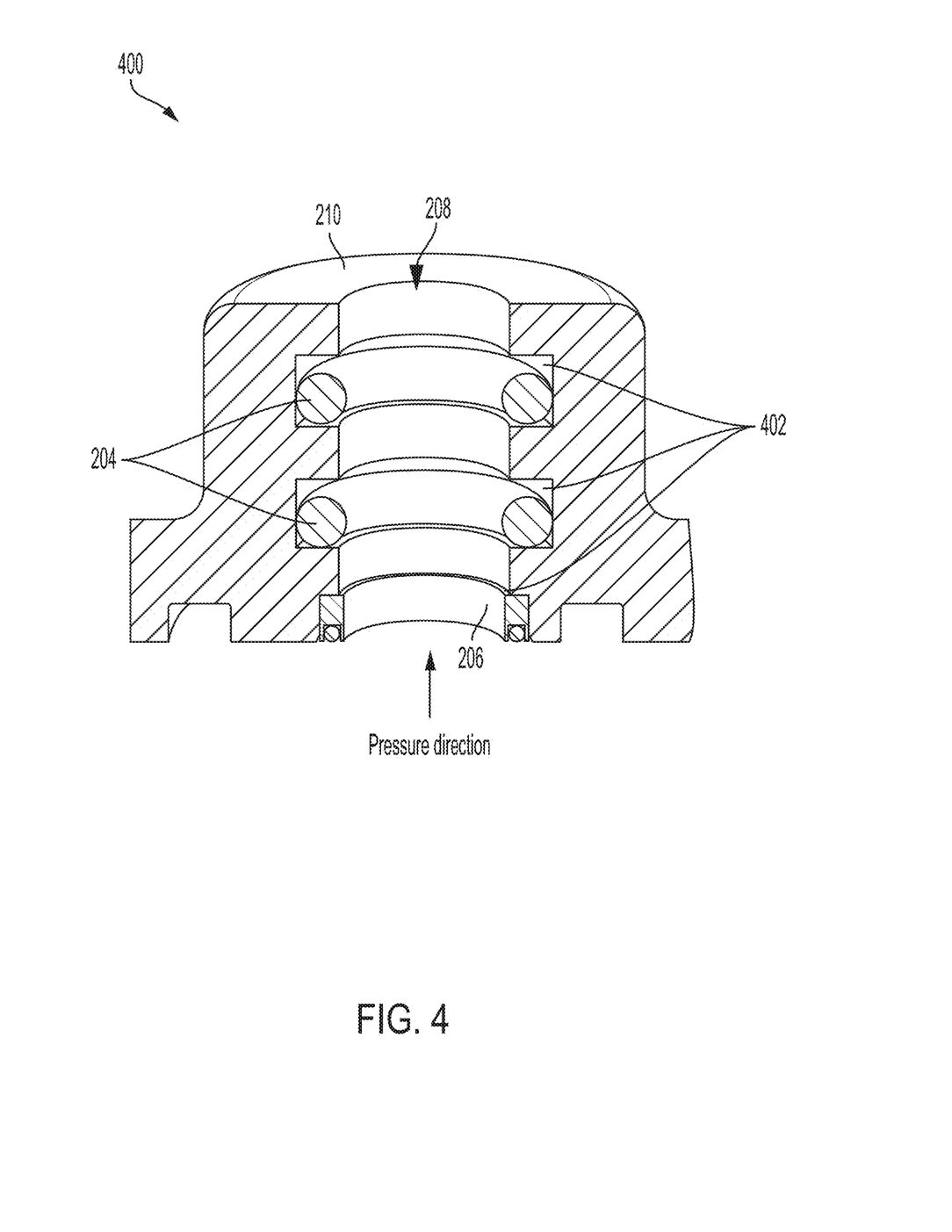
FIG. 4 illustrates a cross sectional view of an alternate exemplary bonnet seal assembly, according to one embodiment of the present disclosure.

Referring now to FIG. 4, a cross sectional view of an alternate exemplary bonnet seal assembly 400 is shown, according to one embodiment of the present disclosure. In particular embodiments, and as mentioned briefly above, the exemplary bonnet seal assembly includes a bonnet 210 that is configured to be securely positioned on top of, or perpendicular to, a valve body, or other casing designed to facilitate the flow of substances, to further provide a leak-resistant seal when securely positioned on top of the valve body.

Various aspects of the present disclosure include a bonnet 210 with a plurality of annular cavities, or slots 402, within a shaft cavity 208 that contain spring energized seals 206 and O-rings 204. In the embodiment shown in FIG. 4, the bonnet includes three annular cavities, whereby a spring energized seal is located in the lowest slot, or cavity, such that it serves as the initial point of contact between the bonnet seal assembly 400 and the substance flowing through the valve body (not shown). The spring energized seal 206 is positioned snuggly within the annular cavity 402, such that the spring is constantly pushing out onto the walls of the cavity 402, creating a gas tight seal. Continuing with this embodiment, as the substance flowing through the valve body applies pressure upwards into the bonnet 210, the spring action of the spring energized seal intensifies and creates a tighter seal between the shaft and the cavity walls with better sealing efficiency.

Continuing with FIG. 4, the first of two O-rings 204 is located in the annular cavity 402 directly above the spring energized seal. In the event that a substance, or portion of a substance, makes it past the spring energized seal, in this embodiment the first of two O-rings 204 serves to provide a secondary sealing mechanism.

In the embodiment shown in FIG. 4, the bonnet seal assembly is completed with the inclusion of a second O-ring 204. In this embodiment, the second O-ring is placed in the third annular cavity up from the bottom, such that it functions as a last line of defense for any substance able to bypass the spring energized seal 206 and the first of the two O-rings 204, so that any fugitive emission is non-existent or nominal.

Figure 5:
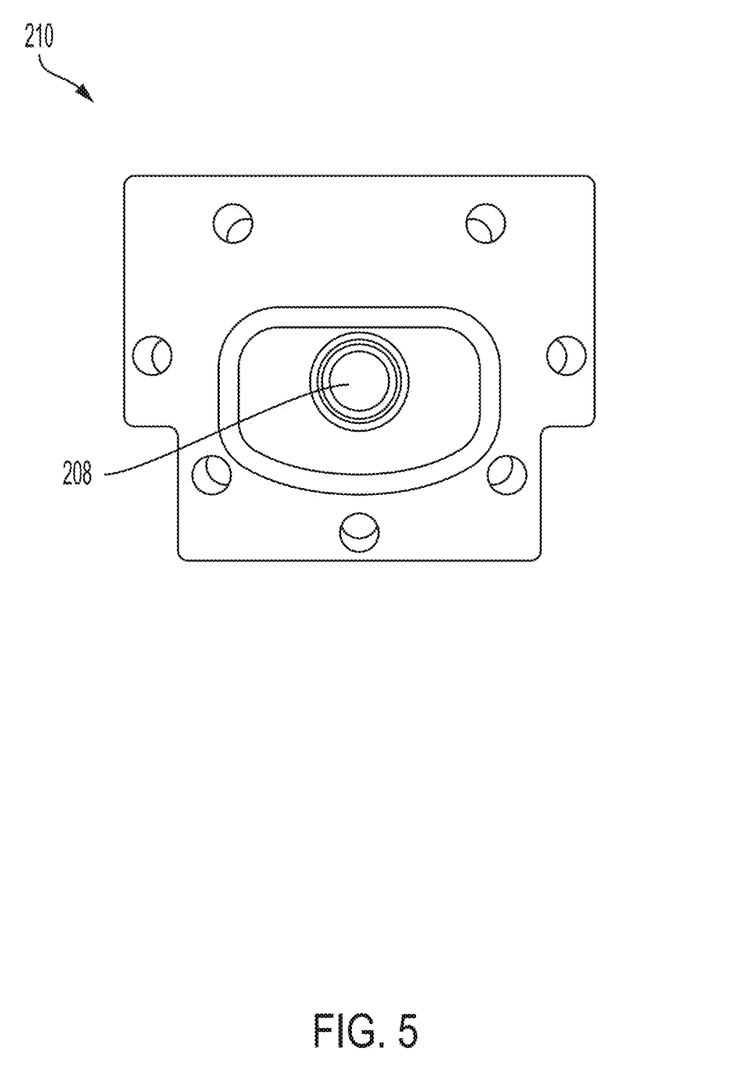
FIG. 5 illustrates a top plan view of an exemplary bonnet, according to one embodiment of the present disclosure.

FIG. 5 shows a top view of an exemplary bonnet, according to one embodiment of the present disclosure. In particular embodiments, and as shown in FIG. 5, the valve assembly includes a bonnet 210 to provide a cover or casing on a valve body. In at least one embodiment, the bonnet includes a shaft cavity 208 that facilitates the inclusion of a stem, or shaft (not shown) to control the flow of fluid within the valve body.

Figure 6:
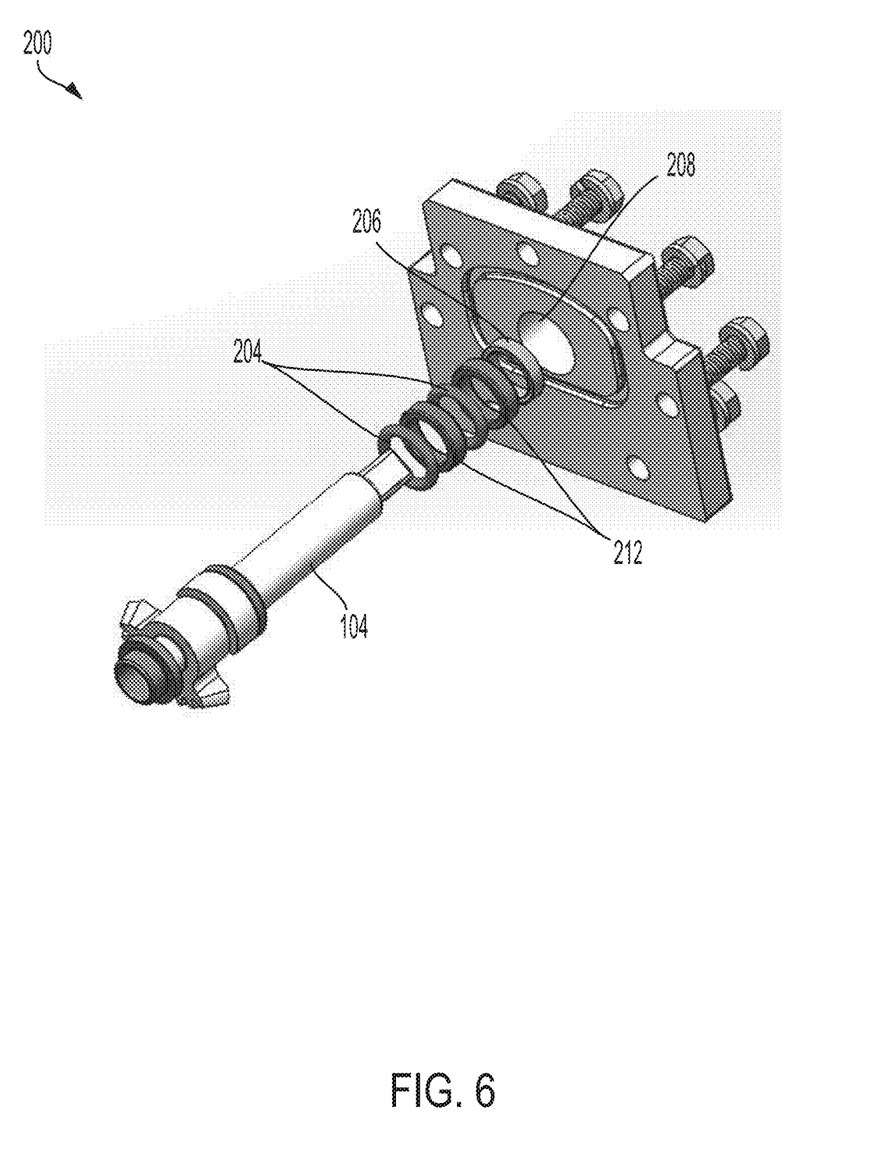
FIG. 6 is an exploded view of an exemplary bonnet seal assembly, according to one embodiment of the present disclosure.

FIG. 6 is an exploded view of an exemplary bonnet seal assembly 200, illustrating the various components of the bonnet seal assembly, according to one embodiment of the present disclosure. In the embodiment shown in FIG. 6, a spring energized seal 206, two PTFE spacers 212, and two O-rings 204 are shown in a configuration as described above in relation to FIG. 2. In this embodiment (and others), an O-ring provides the initial seal and is situated at the base of the shaft 104, followed by a PTFE spacer 212, a second O-ring 204, a second PTFE spacer, and a spring energized seal 206. In various embodiments, and as shown in FIG. 6, the shaft is inserted into a shaft cavity 208 in the bonnet, and the various sealing mechanisms (e.g., O-rings, spring energized seals, PTFE spacers, gaskets, etc.) in the bonnet seal assembly 200 are positioned around the shaft to prevent fugitive emissions from escaping through the shaft cavity 208 (or other crevices in the bonnet).

Figure 7:
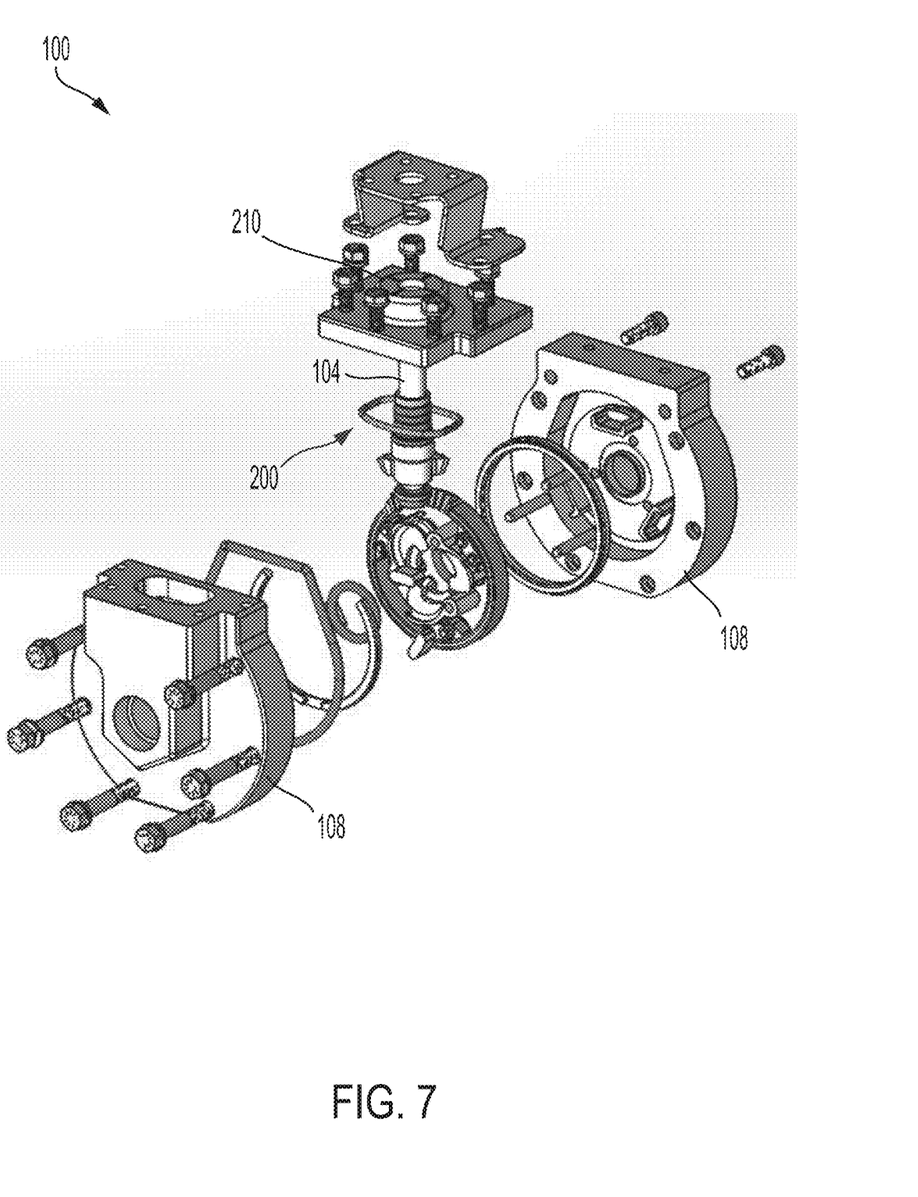
FIG. 7 is an exploded view of an exemplary valve, according to one embodiment of the present disclosure.

FIG. 7 shows an exploded view of an exemplary valve 100 that more clearly illustrates how the various components are connected together, according to one embodiment of the present disclosure. The embodiment shown in FIG. 7 more clearly demonstrates how the various sealing mechanisms (e.g., O-rings, spring energized seals, PTFE spacers, gaskets, etc.) in the bonnet seal assembly 200 are tightly positioned around a shaft 104. Additionally, in one embodiment, FIG. 7 demonstrates the encapsulation of the bonnet seal assembly 200 by the valve body 108 and the bonnet 210.

Alternate Embodiments

Alternative embodiments of the system may comprise features that are, in some respects, similar to the various components described above. In particular, multiple combinations of O-rings, spring energized seals, spacers, gaskets, and other seals are contemplated by this disclosure.

For example, in certain embodiments, the bonnet seal assembly may include one annular cavity within the shaft cavity that allows for the placement, or positioning of a single object within the bonnet that may exhibit a variety of sealant properties. In one or more embodiments, objects that may be placed in the annular cavity include, but are not limited to: O-rings, spring energized seals, PTFE spacers, gaskets, and the like. In one embodiment, the bonnet seal assembly includes one annular cavity where a spring energized seal is located. In this embodiment (and others), the spring energized seal is positioned snuggly within the annular cavity, such that the spring is constantly pushing out onto the walls of the cavity, creating a gas tight seal. Continuing with this embodiment, as a substance flowing through the valve body applies pressure upward into the bonnet, the spring action of the spring energized seal intensifies and creates a tighter seal with better sealing efficiency around the stem.

Additionally, in various alternate embodiments, a spring energized seal may be the last seal to make contact with an escaping substance within a bonnet seal assembly. In such an embodiment, the spring energized seal may be preceded by a PTFE spacer, which may be preceded by an O-ring. In some embodiments, a spring energized seal may be a secondary seal preceded by an O-ring or other seal, and then followed by an O-ring or another seal within the bonnet seal assembly. In certain embodiments, a spring energized seal may be at the base of the bonnet such that the spring energized seal is the first seal to make contact with an escaping substance. In such an embodiment, the spring energized seal may be followed by a spacer, which may then be followed by an O-ring. In one embodiment, the bonnet seal assembly may include two or more spring energize seals. In some embodiments, the bonnet seal assembly may include two or more O-rings. In at least one embodiment, a bonnet seal assembly may include gaskets between seals. In another embodiment, gaskets and spacers may be included in the bonnet seal assembly. Additional embodiments may be derived by repeating, or stacking, the aforementioned embodiments. Many combinations are possible in light of the above teaching.

Additionally, this disclosure contemplates the use of multiple materials in a bonnet seal assembly, including, but not limited to: virgin PTFE, graphite filled PTFE, carbon filled PTFE, polymer filled PTFE, UHMW-polyethylene, hytrel, polyether-ether-ketone (PEEK), Nitrile, and the like. Moreover, depending on the use, O-rings may be coated in a variety of materials, including, but not limited to: powder, parylene, urethane, wet film, PTFE resin, hislip, and other similar materials.

Furthermore, this disclosure is not limited to one form of spring energized seal. The systems and methods described herein have contemplated multiple types of spring energized seals, including, but not limited to: finger springs, coil springs, double coil springs, O-ring energized seals, and the like.

While various aspects have been described in the context of a preferred embodiment, additional aspects, features, and methodologies of the claimed technology will be readily discernible from the description herein, by those of ordinary skill in the art. Many embodiments and adaptations of the disclosure and claimed technology other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed technology. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed technology. In addition, some steps may be carried out simultaneously, contemporaneously, or in synchronization with other steps.

The embodiments were chosen and described in order to explain the principles of the claimed technology and their practical application so as to enable others skilled in the art to utilize the technology and various embodiments and with various modifications as are suited to the particular use contemplated. Alternative embodiments will become apparent to those skilled in the art to which the claimed technology pertains without departing from their spirit and scope. Accordingly, the scope of the claimed technology is defined by the appended claims rather than the foregoing description and the exemplary embodiments described therein.

What is claimed is:

1. A sealing assembly, comprising:
   a sealing body having a cylindrical cavity therein, the cylindrical cavity having a first opening and a second opening for receiving a shaft therethrough; and
   a set of sealing components disposed along an inner annular surface of the cylindrical cavity for preventing fluid flow from the first opening to the second opening between the inner annular surface of the cylindrical cavity and the shaft, the set of sealing components comprising:
      an O-ring;
      a spring-energized seal, the O-ring being positioned closer to the first opening than is the spring-energized seal;
      a spacer positioned along the inner annular surface of the cylindrical cavity between the O-ring and the spring-energized seal; and
      a second O-ring positioned closer to the first opening than is the O-ring.

2. The sealing assembly of claim 1, wherein the set of sealing components further comprises a second spacer positioned along the inner annular surface of the cylindrical cavity between the O-ring and the second O-ring.

3. The sealing assembly of claim 2, wherein the cylindrical cavity includes a recess within which the set of sealing components are disposed.

4. The sealing assembly of claim 3, wherein the recess comprises at least two diameters comprising a larger diameter and a smaller diameter, wherein the spring-energized seal is disposed in the smaller diameter.

5. The sealing assembly of claim 1, wherein the cylindrical cavity includes at least two annular notches.

6. The sealing assembly of claim 5, wherein the O-ring is disposed within a first annular notch and the spring-energized seal is disposed within a second annular notch.

7. A sealing assembly for a valve, comprising:
   a valve body for regulating fluid flow therethrough;
   a bonnet seal affixed to the valve body, the bonnet seal having a cylindrical cavity therein, the cylindrical cavity having a first opening operatively connected to a corresponding opening on the valve body and a second opening for receiving a shaft therethrough, the shaft being operatively attached to the valve body and for regulating the fluid flow; and
   a set of sealing components disposed along an inner annular surface of the cylindrical cavity for preventing fugitive emissions from the valve body through the first opening to the second opening between the inner annular surface of the cylindrical cavity and the shaft, the set of sealing components comprising:
      an O-ring;
      a spring-energized seal, wherein the O-ring is positioned closer to the first opening than is the spring-energized seal;
      a spacer positioned along the inner annular surface of the cylindrical cavity between the O-ring and the spring-energized seal; and
      a second O-ring positioned closer to the first opening than is the O-ring.

8. The sealing assembly of claim 7, wherein the set of sealing components further comprises a second spacer positioned along the inner annular surface of the cylindrical cavity between the O-ring and the second O-ring.

9. The sealing assembly of claim 8, wherein the cylindrical cavity includes a recess within which the set of sealing components are disposed.

10. The sealing assembly of claim 9, wherein the recess comprises at least two diameters comprising a larger diameter and a smaller diameter, wherein the spring-energized seal is disposed in the smaller diameter.

11. The sealing assembly of claim 7, wherein the cylindrical cavity includes at least two annular notches.

12. The sealing assembly of claim 11, wherein the O-ring is disposed within a first annular notch and the spring-energized seal is disposed within a second annular notch.

13. A sealing assembly, comprising:
   a sealing body having a cylindrical cavity therein, the cylindrical cavity having a first opening and a second opening for receiving a shaft therethrough, the cylindrical cavity including at least two annular notches; and
   a set of sealing components disposed along an inner annular surface of the cylindrical cavity for preventing fluid flow from the first opening to the second opening between the inner annular surface of the cylindrical cavity and the shaft, the set of sealing components comprising:
      an O-ring disposed within a first annular notch of the at least two annular notches;
      a spring-energized seal disposed within a second annular notch of the at least two annular notches; and
      a spacer positioned along the inner annular surface of the cylindrical cavity between the O-ring and the spring-energized seal.

14. A sealing assembly, comprising:
   a sealing body having a cylindrical cavity therein, the cylindrical cavity having a first opening and a second opening for receiving a shaft therethrough, the cylindrical cavity including at least two annular notches; and
   a set of sealing components disposed along an inner annular surface of the cylindrical cavity for preventing fluid flow from the first opening to the second opening between the inner annular surface of the cylindrical cavity and the shaft, the set of sealing components comprising:
      an O-ring disposed within a first annular notch of the at least two annular notches;
      a spring-energized seal disposed within a second annular notch of the at least two annular notches; and
      a second O-ring positioned closer to the first opening than is the O-ring.

15. The sealing assembly of claim 14, wherein the set of sealing components further comprises a spacer positioned along the inner annular surface of the cylindrical cavity between the O-ring and the second O-ring.

16. A sealing assembly, comprising:
   a sealing body having a cylindrical cavity therein, the cylindrical cavity having a first opening and a second opening for receiving a shaft therethrough, the cylindrical cavity including at least two annular notches; and
   a set of sealing components disposed along an inner annular surface of the cylindrical cavity for preventing fluid flow from the first opening to the second opening between the inner annular surface of the cylindrical cavity and the shaft, the set of sealing components comprising:
      an O-ring disposed within a first annular notch of the at least two annular notches; and a spring-energized seal disposed within a second annular notch of the at least two annular notches;
wherein the cylindrical cavity includes a recess within which the set of sealing components are disposed.

17. The sealing assembly of claim 16, wherein the recess comprises at least two diameters comprising a larger diameter and a smaller diameter, wherein the spring-energized seal is disposed in the smaller diameter.

18. A sealing assembly, comprising:
a sealing body having a cylindrical cavity therein, the cylindrical cavity having a first opening and a second opening for receiving a shaft therethrough, the cylindrical cavity including at least two annular notches; and
a set of sealing components disposed along an inner annular surface of the cylindrical cavity for preventing fluid flow from the first opening to the second opening between the inner annular surface of the cylindrical cavity and the shaft, the set of sealing components comprising:
an O-ring disposed within a first annular notch of the at least two annular notches; and
a spring-energized seal disposed within a second annular notch of the at least two annular notches;
wherein the spring-energized seal is positioned closer to the first opening than is the O-ring.

19. A sealing assembly, comprising:
a sealing body having a cylindrical cavity therein, the cylindrical cavity having a first opening and a second opening for receiving a shaft therethrough, the cylindrical cavity including at least two annular notches; and
a set of sealing components disposed along an inner annular surface of the cylindrical cavity for preventing fluid flow from the first opening to the second opening between the inner annular surface of the cylindrical cavity and the shaft, the set of sealing components comprising:
an O-ring disposed within a first annular notch of the at least two annular notches; and
a spring-energized seal disposed within a second annular notch of the at least two annular notches;
wherein the O-ring is positioned closer to the first opening than is the spring-energized seal.

20. A sealing assembly for a valve, comprising:
a valve body for regulating fluid flow therethrough;
a bonnet seal affixed to the valve body, the bonnet seal having a cylindrical cavity therein, the cylindrical cavity having a first opening operatively connected to a corresponding opening on the valve body and a second opening for receiving a shaft therethrough, the shaft being operatively attached to the valve body and for regulating the fluid flow, the cylindrical cavity including at least two annular notches; and
a set of sealing components disposed along an inner annular surface of the cylindrical cavity for preventing fugitive emissions from the valve body through the first opening to the second opening between the inner annular surface of the cylindrical cavity and the shaft, the set of sealing components comprising:
an O-ring disposed within a first annular notch of the at least two annular notches; and
a spring-energized seal disposed within a second annular notch if the at least two annular notches.

21. The sealing assembly of claim 20, wherein the set of sealing components further comprises a spacer positioned along the inner annular surface of the cylindrical cavity between the O-ring and the spring-energized seal.

22. The sealing assembly of claim 20, wherein the set of sealing components further comprises a second O-ring positioned closer to the first opening than is the O-ring.

23. The sealing assembly of claim 22, wherein the set of sealing components further comprises a second spacer positioned along the inner annular surface of the cylindrical cavity between the O-ring and the second O-ring.

24. The sealing assembly of claim 23, wherein the cylindrical cavity includes a recess within which the set of sealing components are disposed.

25. The sealing assembly of claim 24, wherein the recess comprises at least two diameters comprising a larger diameter and a smaller diameter, wherein the spring-energized seal is disposed in the smaller diameter.

26. The sealing assembly of claim 20, wherein the spring-energized seal is positioned closer to the first opening than is the O-ring.

27. The sealing assembly of claim 20, wherein the O-ring is positioned closer to the first opening than is the spring-energized seal.

* * * * *